United States Patent
Chen

(10) Patent No.: US 8,862,900 B2
(45) Date of Patent: Oct. 14, 2014

(54) SECURE DISTRIBUTED STORAGE SYSTEM AND METHOD

(75) Inventor: Yu Chen, Vestal, NY (US)

(73) Assignee: The Research Foundation for The State University of New York, Binghampton, NY (US)

(*) Notice: Subject to any disclaimer, the term of this patent is extended or adjusted under 35 U.S.C. 154(b) by 438 days.

(21) Appl. No.: 12/985,488

(22) Filed: Jan. 6, 2011

(65) Prior Publication Data

US 2011/0197056 A1 Aug. 11, 2011

Related U.S. Application Data

(60) Provisional application No. 61/293,409, filed on Jan. 8, 2010.

(51) Int. Cl.
*H04L 29/06* (2006.01)
*H04L 9/06* (2006.01)
*H04L 9/32* (2006.01)

(52) U.S. Cl.
CPC .......... *H04L 9/3228* (2013.01); *H04L 63/0428* (2013.01); *H04L 9/0668* (2013.01); H04L 2209/80 (2013.01)
USPC ........................................................ 713/190

(58) Field of Classification Search
CPC .......................... H04L 63/0428; H04L 9/0668
USPC ........................................................ 713/190
See application file for complete search history.

(56) References Cited

U.S. PATENT DOCUMENTS

| | | | | |
|---|---|---|---|---|
| 5,412,729 A | * | 5/1995 | Liu | 380/37 |
| 5,506,796 A | * | 4/1996 | Ishida | 708/250 |
| 6,317,834 B1 | * | 11/2001 | Gennaro et al. | 713/186 |
| 6,438,230 B1 | * | 8/2002 | Moore | 380/42 |
| 7,013,255 B1 | * | 3/2006 | Smith, II | 703/21 |
| 7,318,072 B2 | * | 1/2008 | Margolus et al. | 1/1 |
| 7,802,096 B1 | * | 9/2010 | Matthews et al. | 713/165 |
| 7,868,788 B2 | * | 1/2011 | Au et al. | 341/51 |
| 8,156,231 B2 | * | 4/2012 | Bellifemine et al. | 709/229 |
| 2003/0046533 A1 | * | 3/2003 | Olkin et al. | 713/152 |
| 2009/0080647 A1 | * | 3/2009 | Mantin et al. | 380/29 |
| 2011/0197056 A1 | * | 8/2011 | Chen | 713/150 |

OTHER PUBLICATIONS

Self-Encryption Scheme for Data Security in Mobile Devices; Yu Chen and Wei-Shinn Ku; CCNC'09, Las Vegas, NV, USA, Jan. 10-13, 2009.*
RFC 1750; Randomness Recommendations for Security; D. Eastlake, S. Crocker, J. Schiller; Dec. 1994.*
Pseudorandom Sequences and Stream Ciphers; Andrew Klapper; 2010.*
Randomness Requirements for Security; RFC 4086; D. Eastlake et al.; Jun. 2005.*

* cited by examiner

*Primary Examiner* — Bradley Holder
*Assistant Examiner* — James Turchen
(74) *Attorney, Agent, or Firm* — Steven M. Hoffberg; Ostrolenk Faber LLP

(57) ABSTRACT

Moving from server-attached storage to distributed storage brings new vulnerabilities in creating a secure data storage and access facility. The Data Division and Out-of-order keystream Generation technique provides a cryptographic method to protect data in the distributed storage environments. In the technique, the Treating the data as a binary bit stream, our self-encryption (SE) scheme generates a keystream by randomly extracting bits from the stream. The length of the keystream depends on the user's security requirements. The bit stream is encrypted and the ciphertext is stored on the mobile device, whereas the keystream is stored separately. This makes it computationally not feasible to recover the original data stream from the ciphertext alone.

20 Claims, 4 Drawing Sheets

SE Scheme Working Flow Illustration.

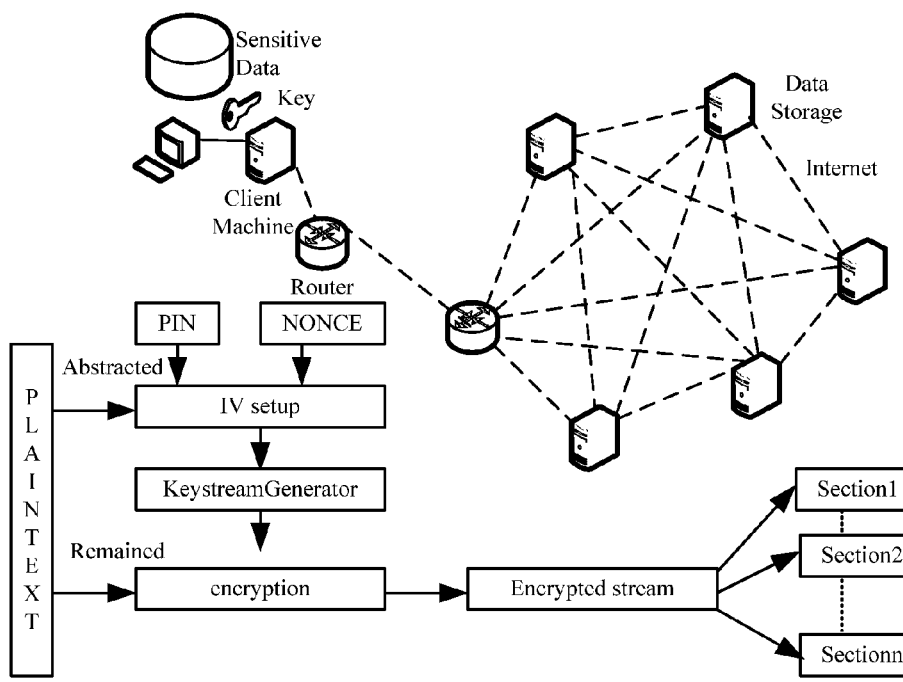
Figure 1. Illustration of the D-DOG scheme principle.

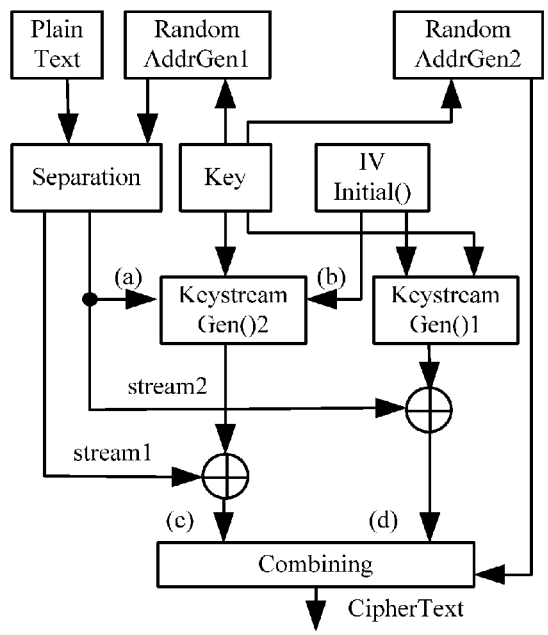
Figure 2. Flowchart of Encryption operation
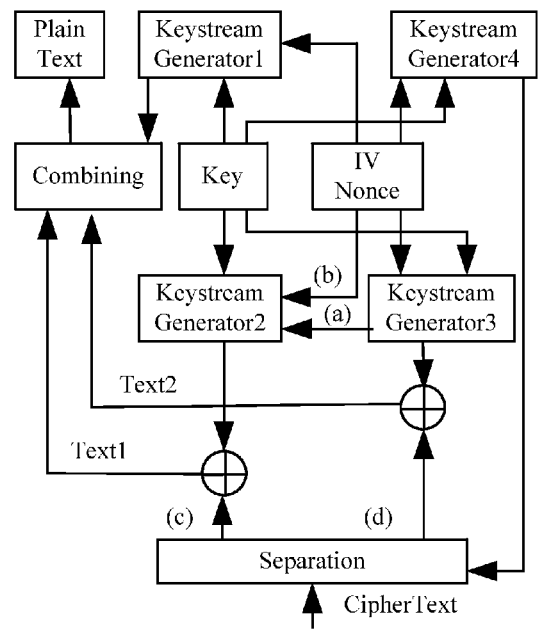
Figure 3. Flowchart of Decryption operation
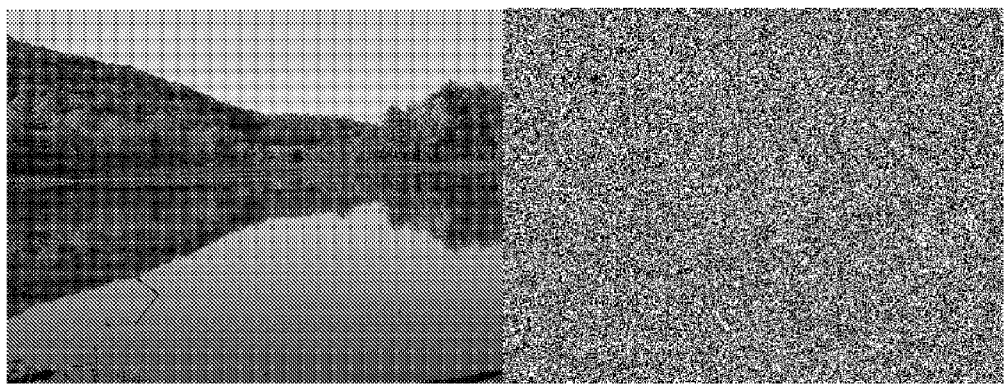
(a) Original image  (b) Output of the encryption
Figure 4. Illustration of the D-DOG encryption effects

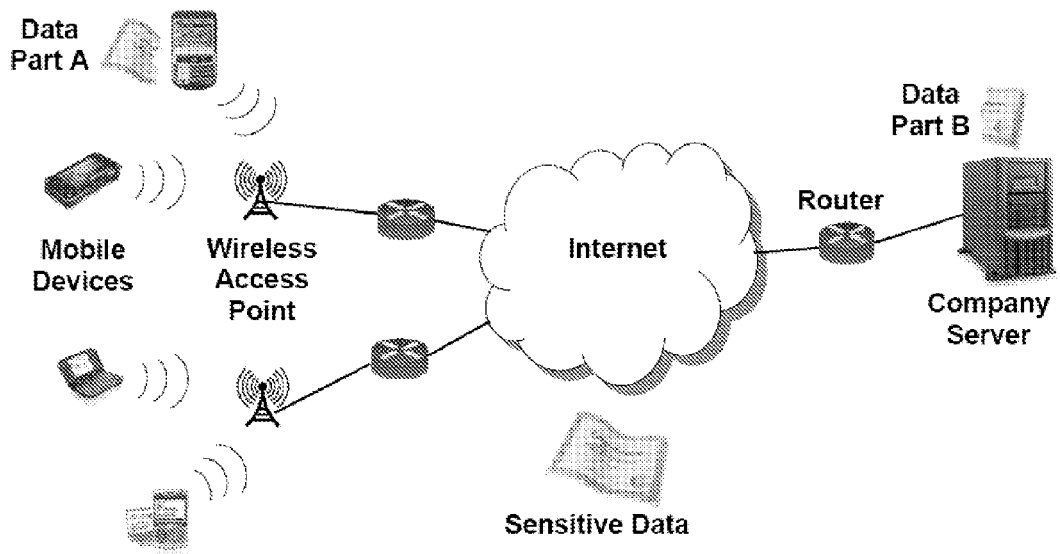
Figure 5. Overview of the Self-Encryption framework.
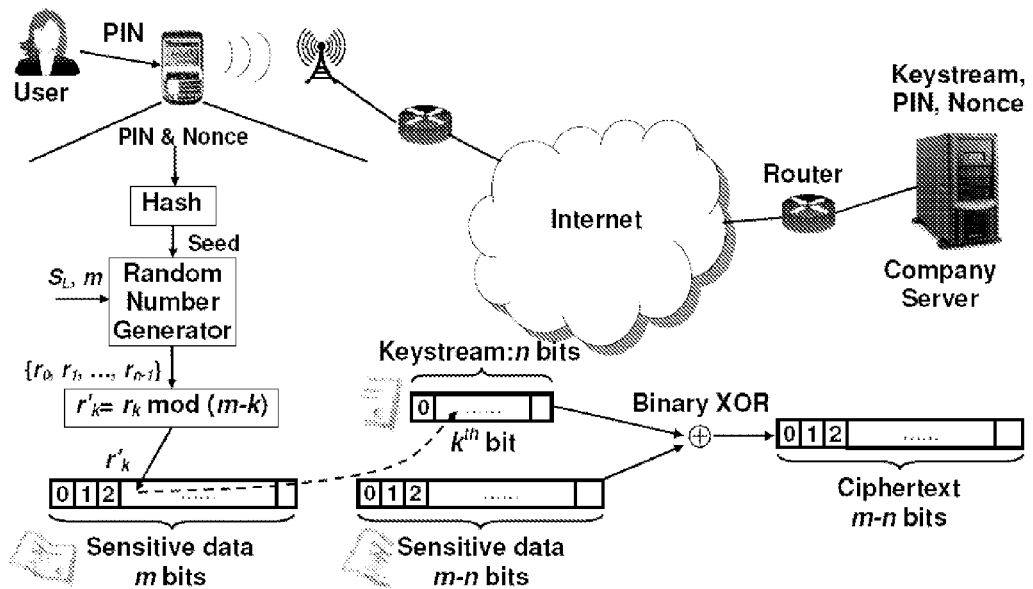
Figure 6. SE Scheme Working Flow Illustration.

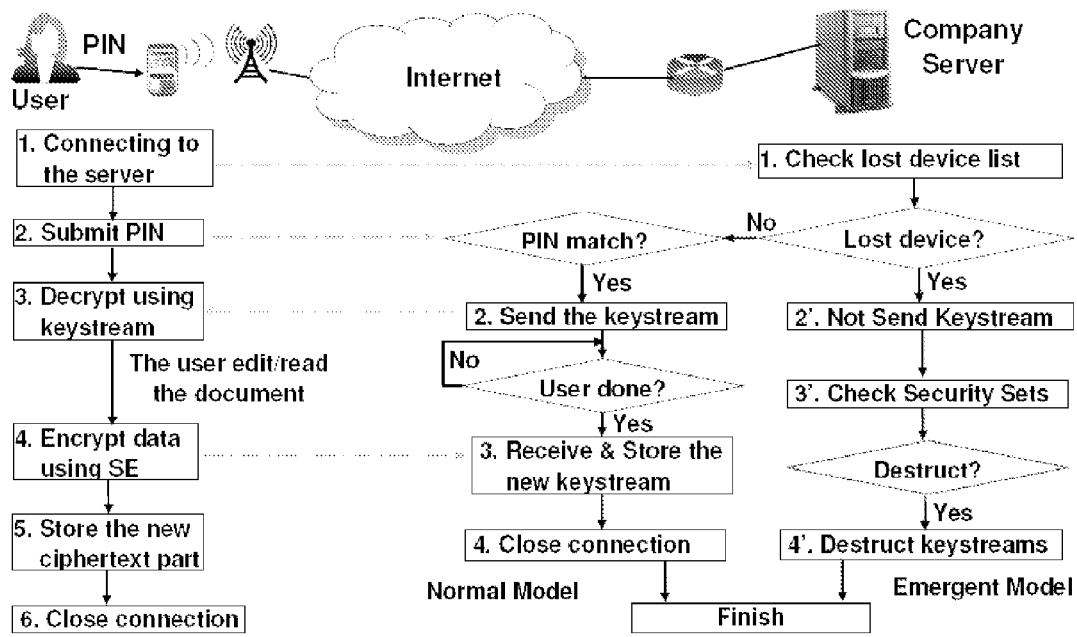
Figure 7. SE Protocol Working Flow Chart.

SECURE DISTRIBUTED STORAGE SYSTEM AND METHOD

BACKGROUND OF THE INVENTION

Data storage has been recognized as one of the main dimensions of information technology. The prosperity of network based applications leads to the moving from server-attached storage to distributed storage. Along with variant advantages, the distributed storage also poses new challenges in creating a secure and reliable data storage and access facility over insecure or unreliable service providers. Being aware of that data security is the kernel of information security, a plethora of efforts has been made in the area of distributed storage security [7], [15], [19].

During past decades, most designs of distributed storage take the form of either Storage Area Networks (SANs) or Network-Attached Storage (NAS) on the LAN level, such as a network of an enterprise, a campus, or an organization. Either in SANs or NAS, the distributed storage nodes are managed by the same authority. The system administrator has the access and control over each node, and essentially the security level of data is under control. The reliability of such systems is often achieved through redundancy, and the storage security is highly dependent on the security of the system against the attacks/intrusions from outsiders. The confidentiality and integrity of data are mostly achieved using robust cryptograph schemes.

However, such a security system is not robust enough to protect the data in distributed storage applications at the level of wide area networks (WANs). The recent progress of network technology enables global-scale collaboration over heterogeneous networks under different authorities. For instance, in the environment of peer-to-peer (P2P) file sharing or the distributed storage in cloud computing environments, the specific data storage technologies are totally transparent to the user [19]. There is no approach to guarantee the data host nodes are under robust security protection. In addition, the activity of the medium owner is not controllable by the data owner. Theoretically speaking, an attacker can do whatever he/she wants to the data stored in a storage node once the node is compromised. Therefore, the confidentiality and the integrity would be violated when an adversary controlled a node or the node administrator becomes malicious.

In the recent years, more and more scientific or enterprise applications have been developed based on the distributed data storage or distributed data computing techniques [9], [14], [15], [19], [20], [21]. Availability and performance are two of the most important metrics in these systems [24]. Data can be stored using encoding schemes such as short secret sharing, or encryption-with-replication. No matter which scheme is chosen, the cipher algorithm is either block cipher based or stream cipher based [8].

The general block cipher AES was designed mainly for the software application and is not generally effective in hardware acceleration environments. Meanwhile, the general stream cipher schemes developed recently in the eSTEAM project [5] follow two different directions. One is for the software application that emphasizes the executing speed of software implementation. The other is hardware oriented, which focuses on the implementation on passive RFID (Radio Frequency Identification) tags or low-cost devices. For instance, the hardware security level for the profile 2 cipher was 80 bits [5], [11]. Although it may be adequate for the lower-security applications where low-cost devices are used, it is not robust enough for general distributed storage network security applications.

Securing sensitive and/or private data in communication and storage has been a critical issue in security research community [6], [16], [20]. Stream ciphers have been widely adopted to provide data security [2], [22]. Although block ciphers have been attracting more and more attention, stream ciphers still are very important, particularly in military applications and to the academic research community. Compared to block ciphers, stream ciphers are more suitable in environments with tight resource constraints or a large amount of streaming data to be encrypted [2], i.e. in wireless mobile devices [3], [22], or wireless sensor networks [6]. When there is a need to encrypt large amount of streaming data, a stream cipher is preferred [2].

In recent years, a lot of efforts have been reported in stream cipher development and many interesting new results have been proposed and analyzed. A popular trend in stream cipher design is block-wise stream ciphers like RC4, SNOW 2.0, and SCREAM [13]. In order to improve the time-data-memory tradeoff for a stream cipher, the concept of Hellman's time-memory tradeoff [3] has been applied and it has achieved tremendous improvements [10]. The Goldreich-Levin [9] one-way function hard-core bit construction has been enhanced into a more efficient pseudo-random number generator BMGL [12] with a proof of security.

Efficient hardware implementations of stream ciphers are important in both high-performance and low-power applications [13]. This is the main trend of the stream cipher development in the future. Radio Frequency Identification (RFID) is expected to be one of the next "killer applications" for hardware-oriented stream ciphers [22]. The second phase of the eSTREAM project in particular focused on stream ciphers suited toward hardware implementation and currently there are eight families of hardware-oriented stream ciphers [5].

In stream ciphers, normally there are two input parameters, the password and an initialization vector (IV). The user password is kept secret and the IV is public. As a consequence, attacks against the IV setup of stream cipher have been very successful [25]. Due to the weakness with the IV setup, more than 25% of the stream ciphers submitted to the eSTREAM project in May 2005 have been broken [1]. Some apparently robust academic designs were broken also due to problems with the IV setup [25].

The pervasive use of wireless networks and mobile devices has been changing our living style significantly [30], [20]. Along with great convenience and efficiency, the progress of technology also brings new challenges in protecting sensitive and/or private information carried in these devices [39]. New vulnerability results from unique characteristics of mobile devices. For instance, due to constraints imposed by limited computing power, storage space, and battery lifetime, a lightweight, rather than computing intensive and complex encryption algorithm, is desired in the mobile devices [26].

In addition, portability makes mobile devices prone to being stolen or lost. It is very challenging to protect the weakly encrypted information on a mobile device, which might end up in the hands of an adversary, who could then use powerful cryptanalysis tools to break the encryption [33]. Therefore, security solutions developed for general distributed data storage systems cannot be adopted directly for this new frontier.

Statistics show that 22% of PDA owners have lost their devices, and 81% of those lost devices had no protection. Even worse, 37% of PDAs have sensitive information on them, such as bank account information, corporate data, passwords, and more [27]. For this reason, some companies do not allow employees to use PDAs or similar mobile devices to store company data [21]. However, effective protection that would enable the full and convenient use of these devices without the fear of losing or compromising data would be a much better scenario.

The most challenging part of mobile device data protection lies in the conflicting requirements for the data encryption scheme. While it should be computationally infeasible for adversaries to decrypt the data in captured mobile devices, the encryption/decryption operation should be reasonably efficient for legitimate users. Furthermore, the required computations should not consume too much energy so as to minimize battery drain.

Data should be protected during the whole life cycle. Authentication and authorization are the preliminary requirements in most data security systems [29]. In general, authentication can be implemented using techniques such as passwords, digital signatures, or MAC (Message Authentication Code). Authorization can be performed by certificates, access control, etc. Considering the risks of system crash or denial-of-service, availability is required in most commercial systems. A typical solution is to make duplicated backup. However, replication increases the cost of consistency maintenance.

The essential task of data security is to prevent any unauthorized third party from revealing or modifying the data. Confidentiality can be achieved by using encryption, while data integrity can be achieved by using digital signatures and/or MAC. During transmit the data can be protected by using protocols such as SSL [34] and IPSec [37]. Meanwhile, at the storage, the data confidentiality can be achieved using user encryption schemes.

To be robust against cryptanalysis, the key sharing [38] and key management [28] are also critical part in the context. Special care has to be taken while storing, archiving, and deleting key materials. Another important consideration is the key recovery system [31], which helps the users to decrypt the ciphertext under certain conditions.

Considering the constraints in mobile devices and the asymmetric power available to a potential adversary, there is no existing solution can be adopted directly to address the data security question in mobile devices.

SUMMARY OF THE INVENTION

The present technology encompasses Data Division and Out-of-order keystream Generation (D-DOG), a high performance hardware implementation oriented stream cipher for distributed storage network. The D-DOG creates cipher blocks by dividing the plaintext data into multiple blocks and encrypting them, where the keystream is generated by abstracting bits from the data blocks in a pseudorandom out-of-order manner.

D-DOG avoids one of the weaknesses existing in modern stream ciphers resulting from the fixed length initialization vector (IV). Treating the data block as a binary stream, D-DOG generates the keystream by extracting n bits from the plaintext in a pseudorandom manner. The length of the keystream n is flexible and can be set according to different specific security requirements. The variable length keystream makes brute force attacks much more difficult. The pseudorandom bit abstracting makes the decrypted data stream still unrecognizable unless the keystream bits are inserted back to the original positions.

A novel stream cipher scheme called self-encryption (SE) is also provided. Treating the data set as a binary bit stream, the keystream is generated by extracting n bits in a pseudorandom manner based on a user's unique personal identification number (PIN) and a nonce. The length of the keystream n is flexible and depends on the security requirements. Then the remaining bit stream is encrypted using this keystream.

The encrypted remainder is stored in the local client or mobile device, whereas the keystream is stored separately. It is very difficult to recover the original data stream from the ciphertext, even if an adversary has the knowledge of the encryption algorithm. The variable length keystream makes brute force attacks infeasible, and the decrypted data stream is still unrecognizable unless the keystream bits are inserted in their original positions.

The D-DOG stream cipher scheme overcomes two common shortcomings in existing stream ciphers:

i) To avoid the weaknesses incurred by the public IV, D-DOG generates an IV based on the user input PIN and an one time nonce;

ii) Fixed-length keystreams are less and less robust facing the fast growing computing power of adversaries. A variable length keystream generation scheme makes brute force attacks computationally infeasible.

Considering the fact that generally mobile devices do not possess as many resources as normal computers, it is very challenging to prevent an adversary from breaking the embedded cryptographic algorithm when the mobile devices are captured. It is also not desirable to implement a complex computing intensive encryption/decryption scheme in a mobile device. Therefore, a novel light-weight approach is provided to protect the information effectively even if an adversary has good knowledge of the encryption algorithm and many more resources to break the cryptography.

The essential idea is that an adversary can only obtain part of the data from the local client or mobile device alone, which is not enough to reveal any useful information. As illustrated by a scenario shown in FIG. 5, the sensitive data is broken into two parts using a self-encryption stream cipher scheme. The major part (Part A: ciphertext) is stored in the mobile device, and the minor part (Part B: keystream+other parameters) is protected in the secure server. Part A is encrypted using part B. When the user needs to access the data, he or she has to input a correct PIN to pass the authentication procedure. Then the server will send part B to decrypt part A and merge them together to recover the original plaintext. When a mobile device is lost, at most the adversary can access the part A, from which it is computationally infeasible to get meaningful information.

It is understood that the present technology is applicable in any system topology where there is a memory which stores, or is intended to store, encrypted information, which is decrypted in response to a remote authentication which is followed by receipt of a keystream. In some environments, it is possible to employ a local server or other non-distributed technology to control encryption or decryption. In addition, though not detailed herein, the present technology can employ various known cryptographic and security paradigms, and is not limited to operation without such additions or modifications. For example, a biometric input may be used to authenticate the user, in a human user interface system. In an automated machine system, the system may operate without a human user interface altogether. A preferred embodiment of the present technology employs a mobile device, such as a cellular telephone; however, the technology is not limited to such devices, and may be used with any type automated computing device.

DETAILED DESCRIPTION OF THE PREFERRED EMBODIMENTS

D-DOG Scheme Rationale

A. Divide-and-Store Principle

The major design goal of the D-DOG strategy is the confidentiality and integrity of the sensitive/privacy data that is stored in the Internet based distributed storage infrastructure such as Grid Storage or Cloud Computing, where the data owner can control neither the reliability/security of the medium, nor the violation of the medium provider or administrators. Either the medium providers or an adversary who has successfully compromised a storage node could do whatever he/she wants to the data in the machine. Therefore, D-DOG has as one goal to make it computationally infeasible to reveal any meaningful information from each ciphertext pieces.

FIG. 1 illustrates the basic divide-and-store principles of the D-DOG scheme. The remote nodes are intended to principally assume the role of a storage medium provider.

At the local user side, the major functions include the following. When a data file is stored:

1) Generating the IV using three elements: the PIN from the user, the nonce generated by the system and the bits abstracted from the plaintext;
2) Constructing the keystream for encryption;
3) Encrypting the remaining plaintext using the keystream;
4) Dividing the cipher text into multiple data blocks with fixed-length, the last block will be stuffed if it consists of fewer bits;
5) Allocating storage nodes in the network and sending each block to one of them (optionally, one or more blocks can be stored locally);
6) Storing the PIN locally and publishing the nonce.

B. Basic Operations of the D-DOG Scheme

As with typical stream ciphers, D-DOG encrypts the plaintext and decrypts the ciphertext by performing the bitwise logical calculation (e.g., XOR) with a keystream:

$$\text{Ciphertext}=\text{Plaintext}\oplus\text{Keystream} \quad (1)$$

As shown in FIG. 1, the D-DOG scheme has three inputs: the plaintext, the user key and a nonce. The plaintext itself is one of the inputs to generate the keystream. Therefore, extra efforts must be considered carefully for the requirements raised by software computation and hardware parallel processing.

FIG. 2 and FIG. 3 present the flowcharts of the encryption operation and decryption operation respectively. The plaintext is inputted into the Separation module, which takes the pseudo-random stream generated by a module named RandomAddrGen1 as the address index and draws the corresponding bits from the plaintext. KeystreamGen module makes use of the key and the data from IV initially as the input and output keystream. The Separation module outputs two separate streams: stream1 and stream2. They are then encrypted by the exclusive or (XOR) with the keystream.

After the stream1 and stream2 are encrypted, they can be combined together, or they can be sent out directly. Both the Combining and the RandomAddrGen2 modules are optional. If the Combining module is used, the RandomAddrGen2 module is used to produce the address for the bit insertion operation. For module Keystream Generator2, there are three encryption pseudo-random generator methods according to the FIG. 2, which are corresponding to different decryption methods, as shown in FIG. 3.

Method (a): Usually, under the secure data storage architecture, any so-far unbroken cipher algorithm may be adopted into the module, including the block cipher. If the path (a) is removed from FIG. 2, the D-DOG cipher scheme is no different from the normal encryption algorithm, except the separate module which introduces extra attack complexity tremendously.

Method (b): When path (a) is introduced into the Keystream Generator2, if the IV/nonce path (b) is disconnected, the decryption scheme should be different from what the scheme (a) is. When path (b) is removed, the plaintext decrypted from Keystream Generator3 is used as the IV/nonce, the plaintext from path (a) and Key from the user enters the Keystream Generator2 and generates the corresponding keystream to decrypt the Text1. The scheme provides a more robust solution than (a).

Method (c): When both path (a) and path (b) in FIG. 3 are considered, it can provide the same safe level of the keystream as the method (b), since the attacker cannot re-use the nonce for a replay attack. Method (c) can also achieve more safety in the IV setup than method (b).

Summary: The main difference between methods (a) and (b) is that path (a) does not consider the operation performed by Keystream Generator3, and this leads to more flexibility. For methods (b) and (c), the designer has to consider the inter-communication between the Keystream Generator2 and Keystream Generator3 module. Especially when the algorithm is implemented in hardware, the time slot should be considered carefully.

BRIEF SUMMARY OF THE DRAWINGS

FIG. 1 shows a system diagram of an embodiment of the invention;

FIG. 2 shows a flowchart of an encryption scheme according to the present invention.

FIG. 3 shows a flowchart of a decryption scheme according to the present invention.

FIGS. 4(a) and 4(b) show black-and-white representations of corresponding color unencrypted and encrypted images.

FIG. 5 shows an overview diagram of a self-encryption framework.

FIG. 6 shows an illustration of the working flow framework of the self-encryption scheme.

FIG. 7 shows a flowchart of the self-encryption scheme.

D-DOG DESIGN

A. Preliminaries u+v: the addition operation, which means u+v mod $2^{32}$;

u⊕v: the bitwise exclusive-or of two words u and v;

{a, b}: the cascadence, for example, {4'he, 4'hf}=8'hef;

u<<<c: c bit left rotation of a word u;

u>>>c: c bit right rotation of a word u, for example, 8'b10011110>>>2 is 8'b10100111;

Four tables, P, Q, M, N are defined to provide variables to the internal state, which are all 512×32 bit words;

K: the 256 bit key;

IV: the 256 initialization vector of the cipher;

T: the 256 bit plaintext;

S: the keystream generated by the gen module;

f(x)=(x>>>7)⊕(x>>>13)⊕(x>>>11)⊕(x>>>18);

g(x,y,z)=(x>>>7)⊕(y>>>18)⊕z(x⊕y);

where z can be either of P, Q, M, N;

h(x,X)=X(x0)+X(x1)+X(x2)+X(x3), where x={x3, x2, x1, x0};

random(i) is a pseudo-bit stream generator as a two-bit counter, which is determined by the number i.

B. Major Procedures Description

The encryption operation consists of three procedures: IVInitial( ), KeystreamGen( ) RandomAddrGen( ). This subsection discusses the design and operation of four major procedures in detail.

1) IV Initial( )

Initialization procedure is used to expand the key, the IV and the plaintext into the tables P, Q, M, N. The operations from a) to d) are shown below.

a. K={K0, K1, . . . , K7}, IV={IV0, IV1, . . . , IV7}, T={T0, T1, . . . , T7}, where Ki, IVi, Ti means a 32 bit number;

b. Generate Wi in the following ways:

Initialize:

Wi=Ki when 0<=i<8;

Wi=IVi-8 when 8<=i<16;

Wi=Ti-16 when 16<=i<24;

Wi=0 when 24<=i<2048;

Wi=f(Wi-11)+f(Wi-13)+f(Wi-7)+f(i-20) when 24<=i<2048.

Then, we define procedure1 as follows:

Wi=f(Wi-11)+f(Wi-13)+f(Wi-7)+f(i-20) when 0<=i<2048.

The minus operation is on the module 2048, for example, i-11 means i-11 mod(2048).

Run the procedure1 1024 steps.

c. Initialize P, Q, M, N by the following procedure.

P(i)=W(i),
Q(i)=W(i+512),
M(i)=W(i+1024),
N(i)=W(i+1536), when 0<=i<512 d. Initialize the internal state by the following procedure.

Run the keystream generation 2048 rounds without the output. Or, the procedure1 may be run 2048 rounds.

2) KeystreamGen( )

The user is allowed to pick up keys and IVs and put them into the keystream generator modules respectively. The keys can be the same, but the IVs should not be the same. It is capable of expanding the key and initialization vector into the internal state more randomly, and it achieves a certain synchronization between the sender and the receiver. Different from other stream cipher designs, the plaintext is inputted to the setup phase to generate an inner state for the keystream generation, if needed.

The P, Q, M, N tables are changed every step. All of the elements in the table will be renewed in 512 rounds. The parallel pseudo code is run as follows:

Do begin
j=random(P(0));
For i=0 to 511 do begin
P(i)=P(i)+P(i+128)+g(P(i+256),P(i+384)),P);
Q(i)=Q(i)+Q(i+128)+g(Q(i+256),Q(i+384)),Q);
M(i)=M(i)+M(i+128)+g(M(i+256),M(i+384)),M);
N(i)=N(i)+N(i+128)+g(N(i+256),N(i+384)),N);
X=P(if j=0) or Q(if j=1) or M(if j=2) or N(if j=3);
S=h(X(i)+X(i+37),X);
End
End while (the keystream bits length is the same as the plaintext)

3) RandomAddrGen( )

RandomAddrGen module generates a random index, here the user's PIN is received and a nonce is input, and the output is an integer seed, which is used as the seed of the random number generator G. The output random number sequence $\{r_0, r_1, \ldots, r_{n-1}\}$ indicates which bits are selected and abstracted from the message (plaintext) to form the keystream. Therefore, we have:

$$\text{seed} = F(\text{PIN}, \text{nonce}) \quad (2)$$

$$\{r_0, r_1, \ldots, r_{n-1}\} = G(\text{seed}) \quad (3)$$

Where $\{r_0, r_1, \ldots r_{n-1}\}$ is a random number sequence generated continuously by G. Here a continuous add modulo method is adopted to avoid collision and out-of-bound problem, which is:

$$r'_k = (r_k + r_{k-1}) \bmod (m-k) \quad (4)$$

Another advantage of this simple algorithm is that it raises the bar of the brute-force attack and can be easily and quickly implemented by hardware.

4) Self-Encryption

We define a security level $S_L$ parameter as the security level and $\Delta$ as the minimum length unit difference between two consecutive security levels. $\Delta$ is a percentage instead of a fixed bit number. This design leads to a unique length of each keystream depending on the concrete message size. It makes the brute force attacks much difficult as the working load for keystream guess is increased exponentially. The keystream length n is calculated as:

$$n = \begin{cases} m \times S_L \times \Delta, & \text{if } S_L \neq 0 \\ 256, & \text{if } S_L = 0 \end{cases} \quad (5)$$

To illustrate the use of equation (5), assume $\Delta=5\%$, for example, then the length of the keystream can be 5% of the original message size when $S_L=1$, 10% when $S_L=2$, 15% when $S_L=3$, and so on. When $S_L=0$, a default fixed keystream length is adopted, where n=256 bits.

FIG. 6 presents a working flow of the SE stream cipher. When the user has finished editing or reading the document, the following works are performed. The seed of the random number generator is calculated by the hash function taking the user's PIN and a nonce as the input. Then, according to the size of the sensitive document and the security level, a sequence of random numbers is generated with length n. By treating the file as a binary stream, this random number sequence indicates which bits in the data file are abstracted to form the keystream.

Then the ciphertext is calculated as a normal stream cipher does. The ciphertext is stored in the mobile device, the keystream, user's PIN, and the nonce are stored in a secure server. Various options regarding transmission and/or storage of data are possible. For example, it may be more secure not to transfer the user's PIN and nonce, instead, backing up the sequence $\{r'_0, r'_1, \ldots r'_{n-1}\}$ is better.

Compared to existing stream cipher schemes, the SE scheme is computationally much more robust. The length of the keystream is not fixed except when the default value (256) is adopted, if the user selected security level $S_L=0$. This raises the bar of brute force attackers, the complexity is increased to $O(2^m)$. Furthermore, to recover the original data stream, the adversary needs to insert every bit of the keystream back correctly. The permutation in this operation is:

$$P_n^m = \frac{m!}{(m-n)!} = m \times (m-1) \times (m-2) \times \ldots \times (m-n+1) \quad (6)$$

The complexity of this part is $O(m^n)$. Then the total complexity is $O(2^m m^n)$, which is much robust than the reported modern stream cipher schemes.

Robustness Analysis

The D-DOG scheme is robust against some of the well known attacks.

Period Attack For D-DOG cipher, the 65,536 internal states ensure that the period of the keystream is extremely large. Because of the fact that the internal state evolves in a nonlinear way, its period is hard to determine. But, the average period of the keystream may be estimated to be about $2^{65,535}$, if we assume that the invertible next-state function of D-DOG cipher is random.

Linear Relations Attack: The large secret table of the D-DOG cipher is updated during the keystream generation process, so it is extremely difficult to develop linear relations linking the input and output bits of the table.

Brute-Force Attack: Brute force attacks are observed very often. The internal state of the D-DOG cipher is about 65,536 bit, and the average period is about $2^{65,535}$, which is enough to resist any brute-force attack so far. In addition, since the D-DOG cipher uses the highly-nonlinear feedback in the keystream generation, the period of the keystream is variable, which makes any attempt that is to attack the stream generated by the separate module unavailable.

Time-Memory-Data Tradeoff Attack: The cost of time/memory/data tradeoff attacks on stream ciphers is $O(2^{n/2})$, where n is the number of inner states of the stream cipher. Due to the choice of the length of the inner state, the time-memory-data tradeoffs attacks costs is $O(2^{32,767})$, which means it is impracticable to execute such method.

Algebraic Attack The principle of an algebraic attack is as the following: the attacker tries to find couples of equations that satisfy the known input and output states, and unknown intermediate states, and then solve the equations; or, for a distinguisher, see whether there is a solution for equations. However, it is very challenging to apply algebraic attacks to recover the secret key because the output and feedback functions of D-DOG cipher are highly non-linear.

Correlation Attacks In order to find a relevant correlation in the cipher, the following questions can be addressed: Is there a linear relation at bit level between some input and output bits? Is there a particular relation between some input bit vector and some output bit vector? However, because the output and feedback functions of the D-DOG cipher are highly non-linear, it is very hard to apply the correlation attacks to recover the secret key.

Differential Analysis Attacks: The idea of a differential attack is that some "small" differences in input states have a perceptible chance of producing "small" differences after the first step of the computation, the second step of the computation, etc. However, the D-DOG cipher uses the 32-to-32-bit mapping similar to that being used in Blowfish, and a rotation method to diffuse the small difference into the whole table, which leads to a large difference in the output. Therefore, it is difficult to guess the key by the differential attacks.

Experiment and Simulation

The D-DOG cipher operation would be tedious and time-consuming to the data owner. It would be preferred if the whole operation can be done automatically with very low time overhead. Therefore, from the users' perspective, the whole D-DOG operation is preferably implemented in an embedded accelerator using reconfigurable hardware devices such as FPGAs (Field Programmable Gate Array). This accelerator pushes the job down to the lower layer of the data communication protocol set and makes it transparent to applications.

For the convenience of hardware implementation, the data file is divided into fixed-length blocks. In fact, storing a fixed-length block at each node makes it more difficult for adversaries to get useful information to reassemble and/or decrypt the ciphertext blocks.

In order to evaluate the performance and the correctness of this design, the D-DOG cipher algorithm was implemented by Modelsim and Synplify on an Altera CycloneII FPGA system. Since it is merely a prototype, the same keystream generator module was used to generate the random stream sequence, and a fixed key and nonce used as the input. The FPGA used is the Altera CycloneII EP2C20F484C8. Modelsim version is 6.2 g, and Synplify version is 8.5, Quartus version is 7.2.

TABLE 1

Comparison between D-DOG and other ciphers

| Cipher | Key Size (bit) | Frequency (MHz) | SLICE | Memory (bit) | Data Width (bit) | Throughput (Mbps) |
|---|---|---|---|---|---|---|
| D-DOG | 256 | 178 | 151 | 49152 | 8 | 1424 |
| AES128 | 128 | 130 | 595 | 32768 | 16 | 208 |
| Trivium* | 80 | 207 | 41 | — | 1 | 207 |
| Grain128* | 128 | 181 | 48 | — | 1 | 181 |
| MICKEY128* | 128 | 200 | 190 | — | 1 | 200 |

*Data comes from reference paper [4], however, the key size of Grain and Mickey becomes 80 bit in the final eStream portfolio due to the hardware environment constraint, such as RFID Tag.

For comparison, an AES encryption was implemented with 128 bit encryption strength into the FPGA chip with Synplify. The following table is the Quartus result comparison. The AES cipher and the three stream cipher were selected in the final portfolio. The D-DOG scheme is compared with AES for two reasons. First, AES is the one of the most popular ciphers used today, and many hardware storage systems adopt AES as their cryptographic method, such as Seagate Inc. The second reason is that there is no standard stream cipher to compare, and the eStream project has been using AES as the reference to evaluate newly developed stream ciphers [5].

As shown in Table 1, the estimated executing frequency of the D-DOG on FPGA device is 178 MHz and the throughput is 1424 Mbps. Compared with AES, it is a light-weighted design since much less hardware resources are consumed. Although D-DOG consumes more resources than Grain and Trivium, its application environment focuses on the throughput and Key Size instead of resources. The result in the Throughput column indicates that the D-DOG outperformed the others, including the AES.

To verify the effectiveness of the D-DOG encryption, FIG. 4(a) (original in color) is chosen as the original example data need to be protected and stored in the distributed storage space. FIG. 4(b) (original showing color pseudorandom noise) presents the output of the cipher process, which provides color pseudorandom noise. Obviously, the D-DOG cipher effectively scrambled the original image to a random looking un-recognizable image. Then, the output was used an as input of the decryption operation. The original image was recovered successfully.

SE Protocol Design

To secure the sensitive data in mobile devices, a protocol set is mandatory to support the functionalities of the SE stream cipher, the AD agent, and the server. In addition, the protocol specifies the behavior of the whole system. At the mobile device side, the major functions include:

1) Setting up connection with the remote server;
2) Retrieving the keystream and nonce for local decryption;

3) Generating a new keystream with a new nonce and encrypting the document; and

4) Transferring the updated keystream and new nonce back to server.

At the server side, the SE protocol supports two working models: a normal model and an emergent model. As implied by its name, the normal model (NM) consists of the working flow when the mobile device is used normally by the legitimate user. The emergent model (EM) is a status that is triggered when a mobile device is reported lost. In fact, EM specifies the countermeasures to be executed when the device is in the hand of an adversary. FIG. 7 illustrates flow charts of both sides in our proposed SE protocol.

When a mobile device is turned on and trying to setup a connection with the server through the network, the first action the server takes is to check whether this mobile device is reported lost. For this purpose, the server maintains a list of reported lost devices. When the mobile device is not in the lost list, the server continues working in the normal model.

As presented along the path in the middle of FIG. 7, the server checks the user's PIN, provides the keystream and nonce to the mobile device, allowing a legitimate user edit/read the document. When a user finishes his or her work, a new keystream and nonce are sent back and stored in the server. During this procedure, if an error in the input PIN error happens three times, the server will suspend the account but won't enter the emergent model.

In contrast, if the device matches a record in the lost list, the server enters the emergent model. It will ignore the received PIN and automatically reject the requirement of keystream materials. The further activities depend on the user's security setting. If the user has explicitly required, the server will destruct the decryption materials permanently.

Conclusions

D-DOG provides a novel steam cipher encryption for data security in distributed storage. The correctness and effectiveness of the D-DOG encryption scheme was verified through simulation and synthesis on top of reconfigurable hardware devices (FPGAs). By pushing the cryptographic processing task to a lower layer of data processing, the operations including encryption, decryption, data division and reassembly are transparent to the higher layer application programs and users.

References

[1] D. J. Bernstein, "Which eSTREAM ciphers have been broken?" http://www.ecrypt.eu.org/stream/, submitted 2008.

[2] A. Biryukov, "Block Ciphers and Stream Ciphers: The State of the Art," Lecture Notes in Computer Science, in Proceedings of the COSIC Summer course, 2003.

[3] A. Biryukov and A. Shamir, "Cryptanalytic time/memory/data tradeoffs for stream ciphers," in Proceedings of Asiacrypt '00, no. 1976 in Lecture Notes in Computer Science, pp. 1-13, Springer-Verlag, 2000.

[4] Philippe Bulens, Kassem Kalach, François-Xavier Standaert and Jean-Jacques Quisquater, "FPGA Implementations of eSTREAM Phase-2 Focus Candidates with Hardware Profile", www.ecrypt.eu.Org/stream/papersdir/2007/024.pdf

[5] eSTREAM Project, http://www.ecrypt.eu.org/stream.

[6] N. Fournel, M. Minier, and S. Ubeda, "Survey and Benchmark of Stream Ciphers for Wireless Sensor Networks," the *Workshop in Information Security Theory and Practices* (WISTP '07), Crete, Greece, May 8-11, 2007.

[7] J. A. Garay, R. Gennaro, C. Jutla, and T. Rabin, "Secure Distributed Storage and Retrieval," in Theoretical Computer Science, 1997.

[8] G. A. Gibson and R. V. Meter, "Network Attached Storage Architecture," Communications of the ACM, 43(11): 37-45, 2000.

[9] O. Goldreich and L. A. Levin, "A hard core predicate for any one way function," in Proceedings of Symposium on Theory of Computing—STOC '89, pp. 25-32, ACM Press, 1989.

[10] J. D. Golic, "Cryptanalysis of alleged AS stream cipher," in *Advances in Cryptology—EUROCRYPT '97*, vol. 1233 of *Lecture Notes in Computer Science*, pp. 239-255, edited by W. Fumy, Springer-Verlag, 1997.

[11] T. Good and M. Benaissa, "Hardware performance of eSTREAM phase-III stream cipher candidates," the State of the Art of Stream Ciphers Workshop (SASC '08), Lausanne, Switzerland, Feb. 13-14, 2008.

[12] J. Hastad and M. Naslund, "Improved analysis of the BMGL keystream generator," in *Proceedings of the Second NESSIE Workshop*, 2001.

[13] D. Hwang, M. Chaney, S. Karanam, N. Ton, and K. Gaj, "Comparison of FPGA-Targeted Hardware Implementations of eSTREAM Stream Cipher Candidates," the State of the Art of Stream Ciphers Workshop (SASC '08), Lausanne, Switzerland, Feb. 13-14, 2008.

[14] G. S. Jedhe, A. Ramamoorthy, and K. Varghese, "A Scalable High Throughput Firewall in FPGA", In 16th International Symposium on Field-Programmable Custom Computing Machines, pp 43-52, 2008.

[15] V. Kher and Y. Kim, "Securing Distributed Storage: Challenges, Techniques, and Systems," StorageSSS '05, Fairfax, Va., USA, Nov. 11, 2005.

[16] P. Kocher, J. Jaffe and B. Jun, "Differential power analysis", *Advances in Cryptology* (Crypto '99), Lecture Notes in Computer Science, 1666 (1999), Springer-Verlag, 388-397.

[17] G. Masaglia. "Die Hard: A battery of tests for random number generators," http://www.stat.fsu.edu/pub/diehard/.

[18] National Institute of Standards and Technology, "A statistical test suite for the validation of random number generators and pseudo random number generators for cryptographic applications," NIST Special Publication 800-22, http://csrc.nist.gov/rng, 2001.

[19] R. Ranjan, A. Harwood, and R. Buyya, "Peer-to-Peer-based Resource Discovery in Global Grids: A Tutorial," IEEE Communications Surveys & Tutorials, Vol. 10, No. 2, 2nd Quarter, 2008.

[20] D. Saha, A. Mukherjee, "Pervasive Computing: A Paradigm for the 21st Century," IEEE Computer, IEEE Computer Society Press, pp. 25-31, March 2003.

[21] P. E. Sevinc, M. Strasser, and D. Basin, "Securing the Distribution and Storage of Secrets with Trusted Platform Modules," Workshop in Information Security Theory and Practices (WISTP '07), Crete, Greece, May 8-11, 2007.

[22] A. Shamir, "Stream Ciphers: Dead or Alive?" invited talk, ASIACRYPT 2004, Jeju Island, Korea, Dec. 5-9, 2004.

[23] J. Walker. "A pseudorandom number sequence test program," http://www.fourmilab.ch/random.

[24] Y. Ye, I. Yen, L. Xiao, and B. Thuraisingham, "Secure, Highly Available, and High Performance Peer-to-Peer Storage Systems", in 11*th IEEE High Assurance Systems Engineering Symposium*, pp 383-391, 2008.

[25] E. Zenner, "Why IV Setup for Stream Ciphers is Difficult," in *Proceedings of Dagstuhl Seminar on Symmetric Cryptography*, January 2007.

[26] J. Al-Muhtadi, D. Mickunas, and R. Campbell, "A Lightweight Reconfigurable Security Mechanism for 3G/4G Mobile Devices," *IEEE Wireless Communications*, April 2002.

[27] N. Wicaksono, "Connecting Windows Mobile with Vista in New Ways", http://narn.my-sites.net, 2007.

[28] S. Rafaeli and D. Hutchison, "A Survey of Key Management for Secure Group Communication," *ACM Computing Surveys*, Vol. 35, Issue 3, September 2003.

[29] A. J. Nicholson, M. D. Corner, and B. D. Noble, "Mobile Device Security Using Transient Authentication," *IEEE Transactions on Mobile Computing*, vol. 5, no. 11, pp. 1489-1502, November, 2006.

[30] W. Daniel, T. Pintaric, F. Ledermann, S. Dieter, "Towards Massively Multi-User Augmented Reality on Handheld Devices", *International Conference on Pervasive Computing*, Munich, Germany, 2005.

[31] D. E. Denning and D. K. Branstad, "A Taxonomy for Key Escrow Systems," *Communications of the ACM*, Vol. 39, Issue 3, 1996.

[32] NetFPGA official homepage, http://yuba.stanford.edu/NetFPGA/, as of Feb. 1, 2008.

[33] Mobile Defender, Sirius Information Technologies, http://sit.bulhost.com/index.html, as of March 2008.

[34] A. O. Freier, P. Karlton, and P. C. Kocher, "The SSL Protocol, Version 3.0," *Internet draft*, Networking Group, March 1996.

[35] C. Galdi, A. Del Sorbo, and G. Persiano, "Distributed Certified Information Access for Mobile Devices," *Workshop in Information Security Theory and Practices* (WISTP '07), Crete, Greece, May 8-11, 2007.

[36] O. Goldreich and L. A. Levin, "A hard core predicate for any one way function," in *Proceedings of Symposium on Theory of Computing—STOC '89*, pp. 25-32, ACM Press, 1989.

[37] A. Kent and R. Atkinson, "Security Architecture for the Internet Protocol," *RFC* 2401, Networking Group, November 1998.

[38] Y. Jiang, C. Lin, M. Shi, and X. Shen, "Multiple Key Sharing and Distribution Scheme with (n, t) Threshold for NEMO Group Communications," *IEEE Journal on Selected Areas in Communications*, Vol. 24, No. 9, September 2006.

[39] K. Greene, "Securing Cell Phones," *Technology Review*, MIT, Wednesday, Aug. 1, 2007.

What is claimed is:

1. A method of encrypting information, comprising:
defining a plaintext message to be encrypted;
defining a subset of the plaintext message comprising a plurality of digital information elements of the plaintext message having a pseudorandom order defined by an algorithm;
constructing a keystream using at least one automated processor with an initialization vector formed from the defined subset, wherein the initialization vector is not constrained to a predetermined length;
encrypting a residual portion of the plaintext remaining after separation of the defined subset from the residual portion, with the keystream into a ciphertext using at least one automated processor; and
storing the defined subset at a location, communicated through a communication network, remote from the encrypted residual portion of the plaintext, such that for at least one time period, the defined subset and the encrypted residual portion of the plaintext are stored remotely from each other with respect to the communication network.

2. The method according claim 1, wherein the initialization vector is further formed based on an encryption password and a nonce.

3. The method according to claim 2, wherein the ciphertext is divided into multiple blocks, which are stored in a memory.

4. The method according to claim 2, wherein at least part of the information defining the keystream is communicated remotely through an automated communication system, and the information defining the keystream is communicated locally for decryption only after authentication of a user requesting decryption.

5. The method according to claim 1, wherein the keystream is generated by extracting removing a sequence comprising a plurality of bits from data blocks of the plaintext message in a pseudorandom out-of-order manner.

6. The method according to claim 1, wherein the keystream is stored separately from the ciphertext.

7. An apparatus for encrypting information, comprising:
a memory configured to store a plaintext message to be encrypted and an encrypted ciphertext resulting from encryption of the plaintext message;
a processor, configured to separate a set, defined by a pseudorandom algorithm, comprising a plurality of digital information elements, from a remainder of the plaintext message, to construct a keystream for the remainder of the plaintext message with an initialization vector formed from at least the separated set comprising the plurality of digital information elements, and to encrypt the remainder of the plaintext remaining after separation of the set comprising the plurality of digital information elements, using the keystream, into the encrypted ciphertext;
an interface between the processor and the memory; and
a communication port configured to communicate the keystream remotely from the memory through a communication network, the keystream being further adapted for decryption of the encrypted ciphertext.

8. The apparatus according claim 7, wherein the initialization vector is further formed based on an encryption password and a nonce.

9. The apparatus according to claim 8, wherein the ciphertext is divided into multiple blocks, which are stored.

10. The apparatus according to claim 8, further comprising a communication port, configured to transmit at least part of the information defining the keystream remotely, and receive the information defining the keystream from a remote memory only after authentication of a user requesting decryption.

11. The apparatus according to claim 8, wherein the plaintext is provided in a communication device configured to communicate through a communication network, the ciphertext is stored in the communication device, and the extracted set of digital information is stored remotely from the communication device.

12. The apparatus according to claim 7, wherein the processor is further configured to generate the keystream by extracting a sequence comprising a plurality of bits from data blocks of the plaintext message in a pseudorandom out-of-order manner.

13. The apparatus according to claim 7, wherein the keystream is stored separately from the ciphertext.

14. A computer readable medium, storing therein non-transitory instructions for controlling a processor to encrypt information, according to the steps of:

receiving a plaintext message to be encrypted;

defining a subset of the plaintext message comprising a plurality of digital information elements of the plaintext message having a pseudorandom order defined by an algorithm;

constructing a keystream using at least one automated processor with an initialization vector formed from the defined subset, wherein the initialization vector is not constrained to a predetermined length;

encrypting a residual portion of the plaintext remaining after separation of the defined subset from the residual portion using the keystream into a ciphertext using at least one automated processor; and communicating the defined subset, through a communication network, to a storage location remote from the encrypted residual portion of the plaintext, such that the defined subset and the encrypted residual portion of the plaintext are storable remotely from each other with respect to the communication network.

15. A method of decrypting information, comprising:

defining a message to be decrypted, comprising an encrypted subset of a plaintext message;

receiving, from a remote location through a communication network, information defining a set comprising a plurality of digital information elements, removed from the plaintext message in accordance with a pseudorandom algorithm;

constructing a keystream with an initialization vector formed from at least the removed set comprising the plurality of digital information elements;

decrypting, using at least one automated processor, the message to be decrypted using the keystream, into the corresponding subset of the plaintext message; and merging, using at least one automated processor, the removed set comprising the plurality of digital information elements and the corresponding subset of the plaintext message, to produce the plaintext message.

16. The method according claim 15, wherein the initialization vector is further formed based on an encryption password and a nonce.

17. The method according to claim 16, wherein at least part of the information defining the keystream is received from a remote storage medium, dependent on authentication of a user requesting decryption.

18. The method according to claim 16, wherein the ciphertext is provided in a mobile communication device, and the removed set of digital information is stored remotely from the mobile communication device.

19. The method according to claim 15, wherein the keystream is generated by removing a sequence comprising a plurality of bits from data blocks of the plaintext message in a pseudorandom out-of-order manner.

20. The method according to claim 15, wherein the keystream is stored separately from the ciphertext.

* * * * *